3,415,640
PROCESS FOR MAKING DISPERSIONS OF
PARTICULATE OXIDES IN METALS
John B. Lambert, Mill Creek Hundred, Del., assignor, by mesne assignments, to Fansteel Metallurgical Corporation, a corporation of Delaware
No Drawing. Continuation-in-part of application Ser. No. 324,234, Nov. 18, 1963. This application Oct. 28, 1966, Ser. No. 590,216
8 Claims. (Cl. 75—.5)

ABSTRACT OF THE DISCLOSURE

When uniform dispersions of small-particle-sized refractory metal oxide particles, such as thoria, in certain matrix metals, such as nickel and nickel-chromium alloys, are made by first making a mixture of the refractory oxide particles and oxides of the matrix metals and then reducing the matrix metal oxide to metal at elevated temperature, there is a marked tendency for the refractory oxide particles to grow to a size larger than desired. This growth tendency is limited by spray-drying droplets of an aqueous solution of a compound of the matrix metal, in which there is dispersed a compound of the metal of the refractory oxide, under the following conditions:

(1) The spray droplets are atomized to a number average diameter in microns, X, less than 100 into an atmosphere at a temperature of $(0.075X^2+200)°$ C. to 950° C., and thereafter (2) The matrix metal compounds in the dried droplets are reduced in a reducing atmosphere, the temperature of which does not exceed 950° C. until the reduction is at least 50% complete.

---

This application is a continuation-in-part of my prior application U.S. Ser. No. 324,234, filed Nov. 18, 1963, and now abandoned.

This invention relates to processes for producing metal matrix-refractory metal oxide powder compositions and is more particularly directed to processes for producing such compositions in which the matrix metal consists essentially of at least one metal which has an oxide with a free energy of formation, $\Delta F$, at 27° C. of from 30 to 88 Kcal. per gram atom of oxygen and the refractory oxide is a metal oxide which has a $\Delta F$ at 27° C. greater than 98 Kcal., and is dispersed in the matrix metal, in which processes an aqueous solution of a compound of the matrix metal is prepared having dispersed therein a compound of the metal of the refractory oxide, said solution is sprayed into the form of droplets, the droplets are dried, and the matrix metal compound in the dried product is thereafter reduced to metal having dispersed therein the refractory oxide in the form of discrete particles having a mean particle diameter, D, not greater than 120 millimicrons, preferably not greater than K, and most preferred not greater than $(0.5 K-11)$ millimicrons where K is the $\Delta F$, as measured at 27° C., of the most stable oxide of any metal of said matrix, and 90% by volume of the refractory oxide particles having a diameter less than 3D, said processes being characterized by the improvement comprising atomizing said droplets to a number-average droplet diameter in microns, X, of less than 100 into an atmosphere at a temperature of $(0.075X^2+200)°$ C. to 950° C., and thereafter reducing the matrix metal compounds in dried droplets in a reducing atmosphere, the temperature of which does not exceed 950° C. until said reduction is at least 50% complete.

It has already been proposed to make metal oxide mixtures by injecting heat-decomposable compounds into an oxidizing flame and thereafter reducing at least one of the so-formed metal oxides to the corresponding metal. In such processes the metal oxide mixture is necessarily exposed to the flame temperature before the reduction occurs. For purposes of the present invention, it has been found that the flame temperatures are entirely too high to give the desired results. Moreover, this prior art practice has other definite disadvantages—namely, contamination of the product with the decomposition products of the flame, especially carbon and sulfur compounds.

If one attempts to adapt known processes to the problem of effecting a uniform dispersion of refractory oxide particles in a matrix metal by first making the metal oxide mixture and then reducing the oxide of the matrix metal one finds that there is a marked tendency for the dispersed refractory oxide to grow to a size larger than that desired. This can occur in two ways: (1) as a necessary condition to the production of a metal oxide mixture in an oxidizing flame as above mentioned, or (2) in connection with reduction of the matrix metal oxide at very high temperatures. Whatever the reason, the growth of the dispersed refractory oxide above a predetermined size is definitely undesirable and there is a need for practical, economical processes which avoid the problem.

Other drying methods have been proposed, but in general these have not recognized the problem of drying particles as small as the refractory oxide particles with which the present invention is concerned. In U.S. Patent 2,900,244 issued to Bradstreet and Griffith a drying method is described in which ceria particles are formed by spraying a cerium nitrate solution onto a mild steel plate maintained at 400–800° F. in an electric furnace, the heat for drying being derived from the hot plate. Some "cryptocrystalline" crystallites which adhere to the hot plate as a coating are said to have indicated particle sizes in the neighborhood of 50–200 Angstroms; however if the cryptocrystalline oxides are heated sufficiently to obtain a stabilized X-ray diffraction pattern, then the resulting particle sizes are said to be such that substantially all of the material will pass through a 1200 mesh screen (i.e. 10 microns) and at least 50% of the material will pass through a 3000 mesh screen. In the processes of the present invention such particle growth is expressly avoided, although heating at elevated temperatures for a prolonged time is required during reduction of the matrix metal compound. Thus, the method of Bradstreet and Griffith is unsuitable for use in the environment of the present invention.

Now according to the present invention it has been found that the growth of the refractory oxide in the matrix metal can be limited and products produced in which the refractory oxide is present as particles having a size not greater than 120 millimicrons. This desirable result may be obtained if a solution of a compound of the matrix metal is prepared having dispersed therein a compound of the metal of the refractory oxide, and this solution is atomized into the form of droplets having a number average droplet diameter, X, less than 100 microns, said atomization occurring into an atmosphere at a temperature of $(0.075X^2+200)°$ C. to 950° C. Thereafter the matrix metal compounds in the dried droplets are reduced in a reducing atmosphere, the temperature of which is not permitted to exceed 950° C., until said reduction is at least 50% complete.

In one aspect of the invention, the atomized droplets are dried, and the dried droplets are heated to a temperature in the range of 300 to 950° C. in an oxygen-containing atmosphere to convert all metal compounds therein to the corresponding oxides. Thereafter the matrix metal compounds are reduced in the reducing atmosphere already described. In a more specific embodiment, the steps of drying the droplets, heating them in the oxygen-containing atmosphere, and reducing the matrix metal compound are carried out without cooling the product between these steps.

In a further embodiment, the compound of the metal of the refractory oxide in the starting solution is one which is water soluble, and is molecularly dissolved in the starting solution. In a preferred aspect of this embodiment, the drying of the droplets is carried out at a temperature high enough to convert the soluble metal compounds present to the corresponding metal oxides. In another preferred aspect of this embodiment, the drying, oxidation heating, and reduction of the matrix metal oxide are carried out without cooling the product between steps.

In specifically preferred processes of the invention, the matrix metal is nickel and the dispersed refractory oxide is thoria. The thoria can be colloidally dispersed in the aqueous solution of nickel salt which is atomized or it can be formed in situ by atomizing a solution of nickel salt and soluble thorium salt such as thorium nitrate. The preferred nickel salt for use in the atomized solution is nickel nitrate.

As a direct result of the control which is exercised upon the droplet size in the processes of this invention the products obtained are powders, in contradistinction to the more massive, shotted products which might be obtained by drying drops, as by impinging them upon a hot plate. In the steps subsequent to the drying step, the solids from a number of droplets may be agglomerated to form larger particles, but by exercise of the indicated control over the process temperatures, the product is retained in the form of a powder and therefore is capable of subsequent working by powder metallurgy techniques.

The matrix metal of the powder compositions consists essentially of one or more metals, each of which has an oxide with a free energy of formation, $\Delta F$, at 27° C. of from 30 to 88 Kcal. per gram atom of oxygen. Metals answering this description, and the free energies of formation of their oxides, are as follows:

| Metal | $\Delta F$ at 27° C. |
|---|---|
| Cu | 35 |
| Cd | 55 |
| Tl | 40 |
| Ge | 58 |
| Sn | 60 |
| Pb | 45 |
| Sb | 45 |
| Bi | 40 |
| Ni | 51 |
| Co | 52 |
| Fe | 59 |
| Mo | 60 |
| W | 60 |
| Re | 45 |
| In | 65 |
| Zn | 76 |
| Cr | 83 |
| Mn | 87 |

Mixtures of these metals can, of course, be used.

In describing this invention, the refractory metal oxide dispersed in the matrix metal will sometimes be referred to as "the filler." The word "filler" is not used to mean an inert extender or diluent; rather, it means an essential constituent of the novel compositions which contributes new and unexpected properties to the metalliferous product. Hence, the filler is an active ingredient.

In processes of this invention, a relatively nonreducible oxide is selected as the filler, that is, an oxide which is not reduced to the corresponding metal by hydrogen, or by the metal in which it is embedded, at temperatures below 1000° C. Such fillers have a $\Delta F$ at 27° C. of more than 98 kilogram calories per gram atom of oxygen in the oxide. The oxide itself can be used as the starting material or it can be formed during the process by heating another metal-oxygen-containing material.

The metal-oxygen-containing material can, for example, be selected from the group consisting of oxides, carbonates, oxalates, sulfates and nitrates and, in general, compounds which, after heating to constant weight at 1500° C., are refractory metal oxides. The ultimate oxide must have a melting point above that of the metal in which it is being used. Oxides with melting points above 1000° C. are preferred. A material with a melting point in this range is referred to as "refractory"—that is, difficult to fuse. Filler particles which melt or sinter at lower temperatures become aggregated.

The filler can be a mixed oxide, particularly one in which each oxide conforms to the melting point and $\Delta F$ above stated. Thus, magnesium silicate, $MgSiO_3$, is a mixed oxide of $MgO$ and $SiO_2$. Each of these oxides can be used separately; also, their products of reaction with each other are useful. The filler, accordingly, is a single metal oxide or a reaction product of two or more oxides; also, two or more separate oxides can be used as the filler. The term "metal oxide filler" broadly includes spinels, such as $MgAl_2O_4$ and $ZnAl_2O_4$, metal carbonates, such as $BaCO_3$, metal aluminates, metal silicates such as magnesium silicate and zircon, metal titanates, metal vanadates, metal chromites, and metal zirconates. With specific reference to silicates, for example, one can use complex structures, such as sodium aluminum silicate, calcium aluminum silicate, calcium magnesium silicate, calcium chromium silicate, and calcium silicate titanate.

Typical single oxide fillers are silica, alumina, zirconia, titania, magnesia, hafnia, and the rare earth oxides including thoria. A typical group of suitable oxides, and their free energies of formation is shown below:

| Oxide | $\Delta F$ at 27° C. |
|---|---|
| $Y_2O_3$ | 145 |
| $CaO$ | 144 |
| $La_2O_3$ | 142 |
| $BeO$ | 136 |
| $ThO_2$ | 140 |
| $MgO$ | 136 |
| $UO_2$ | 123 |
| $HfO_2$ | 126 |
| $CeO_2$ | 122 |
| $Al_2O_3$ | 126 |
| $ZrO_2$ | 123 |
| $BaO$ | 126 |
| $ZrSiO_4$ | 117 |
| $TiO$ | 116 |
| $TiO_2$ | 103 |
| $SiO_2$ | 99 |

The products of the invention are powders. In said powders the mean particle diameter of the refractory oxide is of utmost importance. It is preferred that this diameter should be not greater than K and most preferred not greater than $(0.5K-11)$ millimicrons where K is the $\Delta F$ of the most stable oxide of any metal in the matrix metal. The most stable oxide is, of course, the one most difficult to reduce and having the highest $\Delta F$. The most preferred values for the maximum means particle diameter as calculated for various matrix metals is shown in the following tabulation:

| Most Stable Matrix Metal | K ($\Delta F$ at 27° C.) | Max. Mean D (0.5 K–11) m$\mu$ |
|---|---|---|
| Cr | 84 | 31 |
| Mn | 80 | 29 |
| W | 60 | 19 |
| Mo | 60 | 19 |
| Fe | 59 | 18 |
| Co | 52 | 15 |
| Ni | 51 | 14 |

The particle diameters of the refractory oxide filler particles can be calculated from a measurement of their surface area. Thus, for example, the metal component of a powder product of the invention is dissolved in an acid, or in bromine-methanol, leaving the filler oxide particles, which are recovered by coagulating, centrifuging, washing and drying.

The Br$_2$—CH$_3$OH extraction procedure for example, for a Ni—ThO$_2$ powder is as follows: Calculate the weight of metal for extraction required to give approximately 0.2 gm. ThO$_2$ residue. Thus, 10 gm. of a metal containing 2% ThO$_2$ are required. For each 10 gram portion of metal, prepare 500 ml. of solution containing 5.3% Br$_2$ by volume in dry methanol. Subdivide the metal. If dense, machine to chips. Add the metal slowly with stirring to the Br$_2$—CH$_3$OH solution. Place the solution in a water bath, and cool during the addition. (Temperature should be <35° C.) Avoid frothing caused by excessive gas evolution. After all the metal is added, remove the solution from the water bath, and allow to stand 24 hours with occasional stirring. Allow the residue to settle. Carefully decant the clear supernatant. Centrifuge the remaining residue. Wash and centrifuge the solid residue repeatedly with dry methanol until the supernatant liquor is colorless. Retain all decants and washings for 24 hours to see if additional residue settles out. If so, repeat the centrifuging and washing procedure so as to include this material with the original residue. If, during washing, the ThO$_2$ residue begins to peptize, floc the material by adding 2 to 3 drops of concentrated HNO$_3$, then continue centrifuging. Dry the final, washed residue and weigh.

The surface area of the recovered oxide from the above-described process is then measured by the conventional BET method or its equivalent. (P. H. Emmett in "Symposium on New Methods for Particle Size Determination in the Subsieve Range," Philadelphia: ASTM, 1941, p. 95.) From this surface area measurement, the mean particle diameter, D, is calculated from the expression:

$$D = \frac{6000}{fA_f}$$

where $f$ is the absolute density of the filler oxide particles in grams per milliliter and $A_f$ is their surface area in square meters per gram.

The particle size is a consequence of the control exercised on the droplet size during the spray-drying operation and the subsequent control on the temperature during the steps after drying.

At the start of the process, the refractory oxide must not already be in a form larger than the maximum permissible ultimate size. Accordingly, the solution which is spray-dried contains the refractory oxide, or the parent compound thereof, in a dispersed form. Thus, if the refractory oxide is to be formed during the process, the predecessor compound can be molecularly dispersed in the solution of the matrix metal compound as a true solution. On the other hand, when the refractory oxide is preformed, it can be present in the matrix metal solution as a colloidal dispersion. It will be understood that the soluble refractory oxide compound or colloidally dispersed refractory oxide may be unstable in the presence of the matrix metal solution, and in such event it will be advantageous to mix with the matrix metal solution the refractory oxide compound solution or colloidal dispersion of refractory oxide immediately before spray-drying, as by introducing separate streams of the two components in a chamber immediately preceding the spray nozzle.

In the aspect of the invention in which the filler is formed in situ, a soluble salt of the metal of the filler oxide is dissolved in the solution to be sprayed. Such salt should be one which when heated is decomposed to the oxide. Nitrates and sulfates of lanthanum, calcium, beryllium, magnesium, thorium, aluminum or barium, for example, can be used.

In the aspect of the invention in which the refractory oxide filler is colloidally dispersed in the solution to be atomized, control of the initial particle size of the oxide is effected by known means. Thus, silica aquasols such as those described in Bechtold et al., U.S. Patent 2,574,902, Alexander, U.S. Patent 2,750,345, and Rule, U.S. Patent 2,577,485 are suitable as starting materials. Zirconia sols are likewise useful. The art is familiar with titania sols, and such sols as described by Weiser in Inorganic Colloidal Chemistry, vol. 2, "Hydrous Oxides and Hydroxides," for example, can be used. Also, the beryllia sols described on page 177 of this reference can be used. Thoria aquasols can be prepared by calcining thorium oxalate to 650° C. and dispersing the resulting colloidal thoria in dilute acids.

Although they are less preferred, aerogels and reticulated powders can also be used. For example, products described in Alexander et al., U.S. Patent 2,731,326 can be employed. In these instances, it is necessary that the aggregate structures be broken down to particles in the size range specified, for example, by colloid milling an aqueous slurry to which a small amount of peptizing agent has been added.

Powders prepared by burning metal chlorides, as, for example, by burning silicon tetrachloride, titanium tetrachloride, or zirconium tetrachloride to produce a corresponding oxide, are also very useful if the oxides are obtained primarily as discrete, individual particles, or aggregated structures which can be dispersed to such particles.

Having selected the matrix metal and filler, an aqueous solution containing these is then prepared. In practice, a water-soluble compound of the matrix metal which can be reduced to the metal with hydrogen or carbon is selected as the source of the metal. Nitrates are preferred, although sulfates, oxides, acetates, formates, oxalates, chlorides, bromides or iodides can be used. As in the case of the filler, a colloidal dispersion, for example, of an oxide of a matrix metal can be used.

The selected compound of the matrix metal is dissolved or dispersed in water, and mixed with an aqueous solution containing the compound, which when heated, will produce the filler. For example, in preparing an alloy of iron containing calcia as the filler, one could dissolve a mixture of iron nitrate and calcium nitrate in water and use this solution as the feed to the spray-drier. Similarly, for a cobalt-alumina alloy an aqueous solution of cobalt and aluminum nitrate could be used. Such an alloy could be prepared using an alumina sol instead of Al(NO$_3$)$_2$. Since cobalt nitrate solution may coagulate the sol, it is preferred to mix the cobalt nitrate solution and alumina sol within the spray-drier atomizer or just immediately prior to introduction to the atomizer.

It may be desirable to preheat the feed solutions in order to increase salt solubility and thus the concentration at which the salts are fed to the drier. Higher concentrations are desirable because the evaporative load in the spray-drier is correspondingly decreased. The upper limits on concentration are those where interference with proper atomization or with the obtaining of an adequate metal-filler dispersion occurs. Ordinarily, concentrations in the range of 5 to 60% by weight will be used.

The relative amounts of metal compound and filler depend somewhat on the end use to which the product is to be put, but it is generally in the range such that the product contains from 0.2 to 35% by volume of filler.

Volume loadings as high as 50%, that is, one volume of oxide for each volume of metal present, can be successfully used, but such products are often pyrophoric. Even heating to a temperature approaching the melting point of the metal after reduction does not completely eliminate this problem. Also, the filler particles in such products tend to coalesce to form large, hard aggregates during the reduction step. The problems just discussed are minimized as the volume loading is reduced. In the range of 40 to 50 volume percent of filler, it is advisable to protect the modified metal in an inert atmosphere (hydrogen, argon or nitrogen) until the material is blended with unmodified metal and compacted. Even at 10 volume percent, one often has difficulty sintering the modified metal mass sufficiently that it can be handled in air. A preferred upper limit for refractory oxide particles in matrix metal in the final product is about 5.6 percent by volume.

The equipment used in the spray-drying step is conventional and comprises (1) an atomizer and a supply of hot gas such as nitrogen or air to supply the energy for drying (a 2-fluid atomizer is preferred) and (2) a collecting device for the solid particles, such as a cyclone and/or a bag filter. The critical feature of this step is the particle size of the spray droplet, which must be below 100 microns. The majority of the droplets should be less than 30 microns and preferably between 1 and 10 microns.

The control of the droplet size is effected by choice of suitable atomizers and spraying conditions. For a discussion of spray-drying, see W. L. Marshall, Jr., Chemical Engineering Monograph, Series No. 2, on Atomization and Spray-Drying, published by the American Institute of Chemical Engineers in 1954. Relations which will assist in the selection of atomizers and conditions to obtain the desired droplet sizes are given by Marshall in chapters VII, VIII, and IX describing pressure nozzle, disc, and pneumatic (or 2-fluid) atomization, respectively. Further, for 2-fluid atomizers, an article by Gretzinger and Marshall (A. I. Ch. E. Journal, vol. 7, No. 2, pp. 312–318, June 1961) presents graphs which correlate mass median drop diameter with the ratio $M_a/M_1$, where $M_a$ is the flow rate of the atomizing gas and $M_1$ is the flow rate of the liquid being sprayed. The differences between various methods of averaging particle or drop sizes are thoroughly discussed in the literature, and one may refer, for instance, to chapter VI of the Marshall monograph for equations which relate mass median to number mean diameter.

The desired off-gas temperature from the spray-drier depends on the particular salt solution being dried, and, in general, should be above 150° C., and preferably greater than 220° C. If too low a temperature is used, the product may be hydrated and hency sticky. In this event, the solids from the spray drier will agglomerate and the dispersion of filler in the metal will be ruined. For this reason, the spray-drier should be operated at a temperature in the range of from $(0.075X^2+200)$° C. to 950° C. where X is the number average droplet diameter in microns.

The solid product from the spray-drier should be maintained in the anhydrous state until it is reduced, as is hereinafter described. In a preferred case, these solids are heated in air to convert them to oxides and reduce the surface area of the resulting oxides. Decomposition can, of course, be done in the spray-drier by operating it at sufficiently high temperature. In some cases, however, it may be desirable to have the anhydrous spray-dried product discharge to equipment especially designed for completing the decomposition or calcination. A preferred method is to feed the product discharged from the spray-drier to a fluid-bed calciner.

The temperature required for conversion to oxides varies considerably. Aluminum nitrate, for example, decomposes to $Al_2O_3$ at 150° C., but 770° C. is required to decompose the sulfate. The decomposition temperature of compositions generally is recorded in the chemical literature.

In a preferred aspect, the solids from the spray-drier or calciner, while still hot, are fed directly into the reduction unit.

The matrix metal compounds in the dried droplets are reduced in a reducing atmosphere with the precaution that the temperature does not exceed 950° C. until said reduction is at least 50% complete. By "at least 50% complete" is meant that at least 50% of the matrix metal values present are in the metallic form. This control on the reduction temperature is critically important if the desired uniformity of dispersion of the filler oxide and the control of its particle size are to be obtained.

Reduction can be conveniently accomplished by subjecting the solids to a reducing agent, such as a stream of dry hydrogen, at elevated temperatures. The temperature throughout the entire mass must not be allowed to exceed the sintering temperature of the filler particles. One way to accomplish this is to place the product in a furnace at controlled temperature, and add hydrogen gas slowly. The reduction reaction will not then proceed so rapidly that large amounts of heat are liberated and the temperature in the furnace thus be increased.

Hydrogen to be used in the reduction can be diluted with an inert gas such as argon, or in some cases nitrogen, to reduce the rate of reaction and avoid "hot spots." In this way the heat of reaction will be carried away in the gas stream. Alternatively, the temperature in the furnace can be slowly raised into the range of 500 to 700° C. while maintaining a flow of hydrogen over the product to be reduced.

In addition to, or instead of, hydrogen, carbon monoxide or methane or other hydrocarbon gases can be used as the reducing agent, particularly at elevated temperatures. In any case, it is important that the temperature during reduction be controlled, not only to avoid premature sintering as above mentioned, but also so that excessive reaction will not occur between the reducible compound (such as iron, cobalt or nickel oxide) and the filler oxide before the reducible compound is reduced.

Reduction should be continued until the matrix metal compound is essentially completely reduced to metal. When the reaction is nearing completion, it is preferred to raise the temperature to complete the reduction reaction, but care must be taken not to exceed the melting point of the reduced metal. Reduction should be carried out until the oxygen content of the mass is substantially reduced to zero, exclusive of the oxygen of the oxide filler material. In any case, the oxygen content of the filler metal, exclusive of the oxygen in the filler, should be in the range from 0 to 2% and preferably from 0 to 0.05%, based on the weight of the filler metal.

One way of estimating the oxygen content is to measure the change in weight of a product on treatment with dry, oxygen-free hydrogen at 1300° C. Products which show a change in weight of only from 0.0 to 0.05% under this condition are preferred.

After the reduction reaction is complete, the resulting powder is sometimes pyrophoric. Therefore, it is preferred to cool and store the mass in an inert atmosphere such as argon, and further to blend and compact the mass to reduce surface area in the absence of oxygen or nitrogen.

It is particularly desirable that the filler metal powder be stored in an inert atmosphere such as argon if its surface area is greater than 0.1 square meter per gram. The atmosphere should be essentially free of oxygen, water vapor, nitrogen, sulfur, and any other elements or compounds which are reactive with the metal powder.

An alternative way of reducing the metal in contact with the refractory filler is to subject the coated particles to a metal reducing agent in a fused salt bath. The compound-coated refractory oxide particles are dispersed in the molten salt and the reducing metal is then added while maintaining the temperature of the molten salt in the range of 400 to 1200° C., 950° C. being the maximum until the reduction is at least 50% complete.

The fused salt bath is merely a medium whereby to effect contact of the reducing agent and the metal compound under conditions which will not affect the disposition of the compound with respect to the refractory particles. It can comprise any suitable salt or mixture of salts having the necessary stability, fusion point, and the like.

Suitable fused salt baths can comprise halides of metals selected from Groups I and IIa of the Periodic Table. In general, the chlorides and fluorides are preferred halides. Bromides or iodides can be used, although their stability at elevated temperatures is frequently insufficient. Chlorides are especially preferred. Thus, among the preferred salts are calcium chloride, sodium chloride, potassium chloride, barium chloride, strontium chloride, and lithium chloride and fluoride.

The fused salt bath will usually be operated under a blanket of either an inert gas or a reducing gas. Such gases as helium, argon, hydrogen or hydrocarbon gases can be used in this capacity.

The temperature of the reduction can be varied considerably, depending upon the combination of fused salt and reducing metal selected. In general, the temperature of reduction will be between 400 and 1200° C. It is usually preferred to select a reduction temperature at which the reducing metal, as well as the fused salt, is present in a molten state. Usually the operating temperature will also be below the boiling point of the reducing metal employed.

The operating temperature of the reduction bath must also be below the melting point of the metal coating to be produced on the refractory filler. If, for example, a tungsten compound is being reduced, the reduction temperature will be limited only by the tendency of the filler particles to grow as the temperature is increased, since tungsten has a very high melting point (3370° C.), whereas if a compound of copper, or of a copper-containing alloy having a low melting point, is being reduced, the reduction temperature should be maintained below that of the melting point of the copper or the alloy.

The reducing metal is selected from the group consisting of alkali and alkaline earth metals. Thus, the metal can be lithium, sodium, potassium, rubidium, caesium, beryllium, magnesium, calcium strontium, or barium.

It is preferred to use a reducing metal which has a low solubility in the solid state with respect to the metal of the coating on the refractory oxide particles; otherwise, one will get undesirable alloying of the reducing metal with the metal formed by the reduction. For this reason, calcium and sodium are suitable for reducing compounds of such metals as iron, cobalt, nickel, chromium, or tungsten, while magnesium and sodium are useful in reducing titanium.

It is preferable to use a temperature of reduction at which the reduction reaction proceeds at a rapid rate. For reducing cobalt, iron, and nickel compounds, temperatures in the range of 600 to 800° C. are suitable. With compounds of metals such as chromium, titanium, and niobium, temperatures in the range of 850 to 1000° C. are used, temperatures near the lower end of the range being used initially.

Completion of the reduction reaction can be determined by taking samples from the melt, separating the product from the fused salt, and analyzing for oxygen by ordinary analytical procedures such as vacuum fusion. The reduction is continued until the oxygen content of the mass is substantially reduced to zero, exclusive of the oxygen of the oxide refractory material. In any case, the oxygen content of the product, exclusive of the oxygen in the refractory, should be in the range of from 0 to 2 percent and preferably from 0 to 0.05%, based on the weight of the product.

The required product is present as a suspension in the fused salt bath. It can be separated therefrom by the techniques ordinarily used for removing suspended materials from liquids. Gravitational methods such as settling, centrifuging, decanting and the like can be used, or the product can be filtered off. Alternatively, the bath can be cooled and the fused salt dissolved in a suitable solvent such as dilute aqueous nitric acid or acetic acid.

If a considerable excess of reducing metal is used in the reduction step, it may be necessary to use a solvent less reactive than water for the isolation procedure. In such a case, methyl or ethyl alcohol is satisfactory. The presence of a small amount of acid in the isolation solvent will dissolve any insoluble oxides formed by reaction between the reducing metal and oxygen content of the coating being reduced. After filtering off the reduced metal powder, it can be dried to free it of residual solvent.

Metal-metal oxide powders prepared according to the processes of this invention can be fabricated to dense metal parts by any of several powder metallurgical processes. They can be cold-pressed, sintered, and then hot-worked, or hot-pressed and hot-wkorked. By "hot-working" is meant extrusion to ratios of about 16:1 or greater, rolling, swaging, forging, or coining.

The powders may also be used in casting processes, in those cases where the choice of matrix metal is such as to permit maintenance of the dispersion of the refractory oxide. Examples of systems which may be used in casting processes are described in U.S. Patent 3,028,234.

The invention will be better understood by the following illustrative examples.

Example 1

This example describes a spray-drying method of forming an oxygen-containing compound of nickel around discrete alumina particles. The process was carried out as follows: 3300 g. $Ni(NO_3)_2 \cdot 6H_2O$ and 63 g.

$$Al(NO_3)_2 \cdot 9H_2O$$

were dissolved in water and diluted to 3000 ml. This solution was spray-dried by feeding it through an atomizer into a stream of hot air in the drier. A specially constructed nozzle was used in order to prevent caking of the solution in the nozzle. This nozzle consisted of a center tube, a concentric middle tube filled with cool air, and a concentric outer tube of hot air. The solution was fed at the rate of 8 lbs./hour along with 20 lbs./hour of cool air and 100 lbs./hour of hot air, i.e. at a temperature of 400° C. Dry hot air at 400° C. was fed into the spray drier at the rate of 180 lbs./hour. The temperature of the gas leaving the drier was 230° C.

The solution was atomized to droplets in the size range of 1–10 microns. It was dried to a powder containing $Ni(NO_3)_2$—$Al(NO_3)_3$. This product was further heated at 450° C., whereupon it decomposed to a mixture of NiO and $Al_2O_3$.

The powder product was placed in a furnace, heated to a temperature of 500° C., and hydrogen was slowly passed over it at such a rate that sufficient hydrogen was added to the nickel oxide to reduce it in a period of four hours. The flow of hydrogen was maintained at a steady, uniform rate for eight hours. Thereafter, the temperature was raised to 700° C. and the flow of dry, pure hydrogen was greatly increased, and finally the temperature was raised to 1050° C. to complete the reduction, and sinter the reduced powder.

Example 2

This example describes the preparation of a nickel-chromium alloy modified with colloidal thoria. A solution containing 2333 g. $Ni(NO_3)_2 \cdot 6H_2O$, 907 g.

$$Cr(NO_3)_3 \cdot 9H_2O$$

and 158 g. $Th(NO_3)_4 \cdot 4H_2O$ was prepared by dissolving these nitrates in hot water and diluting to 3 liters. This solution was fed to a spray drier having an atomizing nozzle similar to that of Example 1. The drying conditions were: inlet air temperature 390° C. at a rate of 200 lbs./hour; atomizing air at 400° C. and 87 lbs./hour; cooling air 16 lbs./hour. Air leaving the spray drier was 220° C. The feed solution was atomized to droplets 6 microns in average size, and fed over 2 hours. The powder product so obtained was heated in air at 450° C. to convert the nitrates to oxides.

The washed, dried, pulverized powder was reduced at 645° C. for 12 hours, then at 950° C. for an additional 6 hours and finally at 1100° C. for 80 hours. During all this time, preheated, very pure hydrogen was fed into the reduction chamber at a rate such that the linear velocity of gas over the powder was about 1 ft./second. The dew point of the effluent hydrogen was −55° C. at the end of the reduction. In this way the nickel and chromium oxides were essentially reduced to metal, and a metal powder containing 120 millimicrons thoria particles, uniformly dispersed and on the average 150 millimicrons apart, was produced.

Example 3

This example describes the preparation of a thoria-tungsten product. 1041 g. $WO_3 \cdot H_2O$ was dissolved in 4 l. conc. $NH_4OH$ and the solution was diluted to 6 l. with $H_2O$. 3425 g. of this solution was mixed with 2050 g. of a $ThO_2$ sol (3% $ThO_2$ solids by weight as 10 millimicron $ThO_2$ particles) with an Eppenbach mixer. The solution obtained was fed to a spray drier in 50 minutes, with inlet air at 365° C. and 192 lbs./hour, atomizing air at 395° C. and 86 lbs./hour and cooling air at 11 lbs./hour. Particle size of the atomized droplets was 5 microns. Exit air temperature was 180° C.

The resulting $WO_3$—$ThO_2$ powder was reduced to W—$ThO_2$, using hydrogen at 1100° C.

Example 4

In this example a product consisting of nickel containing finely dispersed thoria was prepared. Two thousand nine hundred and eight grams of crystals of

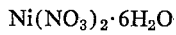

$$Ni(NO_3)_2 \cdot 6H_2O$$

were heated in a feed tank to 80° C., at which temperature the material was fluid and only slightly more viscous than water. To this solution was added 27.6 grams of $Th(NO_3)_4 \cdot 4H_2O$ with stirring. The mixed nitrate solution was then fed to the atomizer described in Example 1 and spray-dried, a very fine dispersion of particles being obtained. All of the lines transferring the solution from the feed tank to the atomizer were heated with steam to prevent pluggage during transfer. The solution was fed at the rate of 4 lbs./hour. The cooling air was preheated to 100° C. and fed at the rate of 20 lbs./hour and hot air at 750° C. was fed at 50 lbs./hour. Hot, drying air was fed at 100 lbs./hour and about 750° C. inlet temperature. The outlet air from the stainless steel drier contained nitrogen oxides as well as water vapor. The product was discharged into a cyclone, the wall temperature of which was maintained at 450° C. by electrical heating strips.

At the conclusion of the run, the product was recovered and fed immediately to a reduction unit. The reduction was carried out as described in Example 1. The product obtained was a nickel powder having about 2% thorium oxide finely dispersed in it. The mean particle diameter of the $ThO_2$ in this Ni—$ThO_2$ powder (determined by the $CH_3OH$—$B_2$ extraction method was 12 millimicrons.

I claim:
1. In a process for producing metal matrix refractory metal oxide powder compositions in which the matrix metal consists essentially of at least one metal which has an oxide with a free energy of formation, $\Delta F$, at 27° C. of from 30 to 88 Kcal. per gram atom of oxygen and the refractory oxide is a particulate metal oxide which is dispersed in the matrix metal, has a $\Delta F$ at 27° C. greater than 98 Kcal., and has a mean particle diameter, D, not greater than 120 millimicrons, in which process an aqueous solution of a compound of the matrix metal is prepared having dispersed therein a compound of the metal of the refractory oxide, said solution is sprayed into the form of droplets, the droplets are dried, and the matrix metal compound in the dried product is thereafter reduced to metal having dispersed therein the refractory oxide, the improvement which comprises atomizing said droplets to a number average droplet diameter in microns, X, less than 100 into an atmosphere at a temperature of $(0.075X^2+200)°$ C. to 950° C., and thereafter reducing the matrix metal compounds in the dried droplets in a reducing atmosphere, the temperature of which does not exceed 950° C. until said reduction is at least 50% complete.

2. In a process for producing metal matrix refractory metal oxide powder compositions in which the matrix metal consists essentially of at least one metal which has an oxide with a free energy of formation, $\Delta F$, at 27° C. of from 30 to 88 Kcal. per gram atom of oxygen and the refractory oxide is a metal oxide which has a $\Delta F$ at 27° C. greater than 98 Kcal., is dispersed in the matrix metal, and has a mean particle diameter, D, not greater than K millimicrons where K is the $\Delta F$, as measured at 27° C., of the most stable oxide of any metal of said matrix, and 90% by volume of the refractory oxide particles having a diameter less than 3D, the steps comprising (1) preparing an aqueous solution of a compound of the matrix metal, said solution having dispersed therein a compound of the metal of the refractory oxide, (2) atomizing said solution to droplets having a number average droplet diameter in microns, X, less than 100 in an atmosphere at a temperature of $(0.075X^2+200)°$ C. to 950° C., (3) drying said droplets, (4) heating the dried droplets to a temperature in the range of 300 to 950° C. in an oxygen-containing atmosphere to convert all metal compounds therein to the corresponding oxides, and (5) thereafter reducing the matrix metal compounds in a reducing atmosphere, the temperature of which does not exceed 950° C. until said reduction is at least 50% complete.

3. A process of claim 2 wherein steps 3, 4 and 5 are carried out without cooling the product between steps, and the refractory oxide has a mean particle diameter not greater than $(0.5K-11)$ millimicrons where K is the $\Delta F$, as measured at 27° C., the most stable oxide of any metal of said matrix and 90% by volume of the refractory oxide particles having a diameter less than 3D.

4. In a process for producing metal matrix-refractory metal oxide powder compositions in which the matrix metal consists essentially of at least one metal which has an oxide with a free energy of formation, $\Delta F$, at 27° C. of from 30 to 88 Kcal. per gram atom of oxygen and the refractory oxide is a metal oxide which has a $\Delta F$ at 27° C. greater than 98 Kcal., is dispersed in the matrix metal, and has a mean particle diameter, D, not greater than $(0.5K-11)$ millimicrons where K is the $\Delta F$, as measured at 27° C., of the most stable oxide of any metal of said matrix, the proportion of the refractory oxide being up to 5.6 percent by volume, and 90% by volume of the refractory oxide particles having a diameter less than 3D, the steps comprising (1) preparing an aqueous solution of an oxygen compound of the matrix metal and an oxygen compound of the metal of the refractory oxide, (2) atomizing said solution to droplets having a number average droplet diameter in microns, X, less than 100 in an atmosphere at a temperature of $(0.075X^2+200)°$ C. to 950° C., (3) drying said droplets, (4) heating the dried droplets to a temperature in the range of 300 to 950° C. to convert the soluble metal compounds present to the corresponding metal oxides, and (5) thereafter reducing the matrix metal oxides in a reducing atmosphere, the temperature of which does not exceed 950° C. until said reduction is at least 50% complete.

5. A process of claim 4 wherein the drying of the droplets in step 3 is carried out at a temperature high enough to convert the soluble metal compounds present to the corresponding metal oxides according to step 4.

6. A process of claim 4 wherein steps 3, 4, and 5 are carried out without cooling the product between steps.

7. In a process for producing nickel matrix-thoria powder compositions in which the thoria has a particle size of 5 to 120 millimicrons, and is dispersed in the nickel metal matrix, the steps comprising (1) preparing an aqueous solution of nickel nitrate and thorium nitrate, (2) atomizing said solution to droplets having a size less than 100 microns, (3) drying said droplets, (4) heating the dried product to a temperature in the range of 300 to 800° C., whereby the nickel nitrate is converted to nickel oxide and the thorium nitrate to thoria, and (5) heating the mixed oxides in a dry reducing gas at a temperature in the range of 400 to 900° C., whereby the nickel oxide is reduced to nickel.

8. In a process for producing nickel matrix-thoria powder compositions in which the thoria has a particle size of 5 to 120 millimicrons, and is dispersed in the nickel metal matrix, the steps comprising (1) separately preparing an aqueous nickel nitrate solution and an aqueous colloidal dispersion of thoria, (2) mixing said solution and dispersion, (3) atomizing said aqueous mixture to droplets having a size less than 100 microns, (4) drying said droplets, (5) heating the dried product to a temperature in the range of 300 to 800° C. whereby the nickel nitrate is converted to nickel oxide, and (6) heating the mixed oxides in a dry reducing gas at a temperature in the range of 400 to 900° C., whereby the nickel oxide is reduced to nickel.

References Cited

UNITED STATES PATENTS

| | | | |
|---|---|---|---|
| 2,900,244 | 8/1959 | Bradstreet et al. | 75—.5 |
| 3,085,876 | 4/1963 | Alexander et al. | 75—.55 |

L. DEWAYNE RUTLEDGE, *Primary Examiner.*

W. W. STALLARD, *Assistant Examiner.*

U.S. Cl. X.R.

264—13